US007958293B2

(12) United States Patent
Bakke et al.

(10) Patent No.: US 7,958,293 B2
(45) Date of Patent: Jun. 7, 2011

(54) VIRTUALIZED SERIAL ATTACHED SCSI ADAPTER

(75) Inventors: Brian E. Bakke, Rochester, MN (US); Ellen M. Bauman, Rochester, MN (US); Timothy J. Schimke, Stewartville, MN (US); Lee A. Sendelbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 12/116,650

(22) Filed: May 7, 2008

(65) Prior Publication Data

US 2009/0327537 A1    Dec. 31, 2009

(51) Int. Cl.
*G06F 3/00* (2006.01)
*G06F 13/12* (2006.01)
*G06F 13/38* (2006.01)

(52) U.S. Cl. ................. 710/74; 710/36; 710/62

(58) Field of Classification Search ............... 710/74, 710/36, 62
See application file for complete search history.

(56) References Cited

U.S. PATENT DOCUMENTS

| 7,284,104 | B1 | 10/2007 | Wu et al. | |
|---|---|---|---|---|
| 7,464,405 | B2 | 12/2008 | Dawkins et al. | |
| 7,644,204 | B2 * | 1/2010 | Marripudi et al. | 710/40 |
| 2006/0064567 | A1 | 3/2006 | Jacobson et al. | |
| 2006/0174087 | A1 * | 8/2006 | Hashimoto et al. | 711/173 |
| 2007/0165660 | A1 * | 7/2007 | Fang et al. | 370/410 |
| 2008/0189570 | A1 * | 8/2008 | Terashima et al. | 714/2 |
| 2009/0150640 | A1 * | 6/2009 | Royer et al. | 711/173 |

\* cited by examiner

*Primary Examiner* — Alford W Kindred
*Assistant Examiner* — Zachary K Huson
(74) *Attorney, Agent, or Firm* — Rabin & Berdo, PC

(57) ABSTRACT

A method, computer program product and computer system for the virtualization of an SAS storage adapter for logical partitions of a computer system, which includes providing a hypervisor, assigning a logical storage adapter to an operating system on one of the logical partitions, configuring the logical storage adapter using the hypervisor, and enabling data storage operations to use the logical storage adapter.

24 Claims, 5 Drawing Sheets

//VIRTUALIZED SERIAL ATTACHED SCSI ADAPTER

BACKGROUND

1. Technical Field

The present invention relates to storage adapters. More specifically, it relates to the virtualization of an SAS (Serial Attached Small Computer System Interface) adapter for logical partitions of a computer system.

2. Background Information

Large computer systems are usually partitioned into a number of logical partitions. Each logical partition represents a division of resources in the system and operates as an independent logical system. An example of logical partitions is the partitioning of a multiprocessor computer system into multiple independent servers, each with it own processors, main storage, and I/O devices.

A typical resource that each logical partition requires is disk storage. Many systems utilize SAS devices to provide storage. SAS is a data transfer technology designed to replace parallel SCSI (Small Computer System Interface) with added performance, scalability and redundancy. It can provide SATA (Serial Advanced Technology Attachment) compatibility and interoperability, cost-effective tiered storage deployments, and flexibility in disk drive and platform choices.

A drawback to current implementations of the logical partitions is that each partition is required to have its own storage adapter. Hence, for a large computer system, a large number of physical storage adapters are needed, and, to provide the associated PCI (Peripheral Component Interconnect) or PCI Express adapter slots for these adapters, a large number of enclosures are also required, which lead to significant additional expenses. Current implementations also require that each partition has its own storage devices, which results in an excess number of storage devices and the corresponding enclosures used to house them. Moreover, each enclosure typically is packaged as a single SAS domain so that the enclosure is limited to a single partition. Therefore, a partition that needs a single device (or a couple of devices) must bear the cost of the complete enclosure that may have many empty device slots, which also causes a significant waste of resources.

SUMMARY

A method, computer program product and computer system for the virtualization of an SAS storage adapter for logical partitions of a computer system, which includes providing a hypervisor, assigning a logical storage adapter to an operating system on one of the logical partitions, configuring the logical storage adapter using the hypervisor, and enabling data storage operations to use the logical storage adapter.

DETAILED DESCRIPTION

Figure 1:
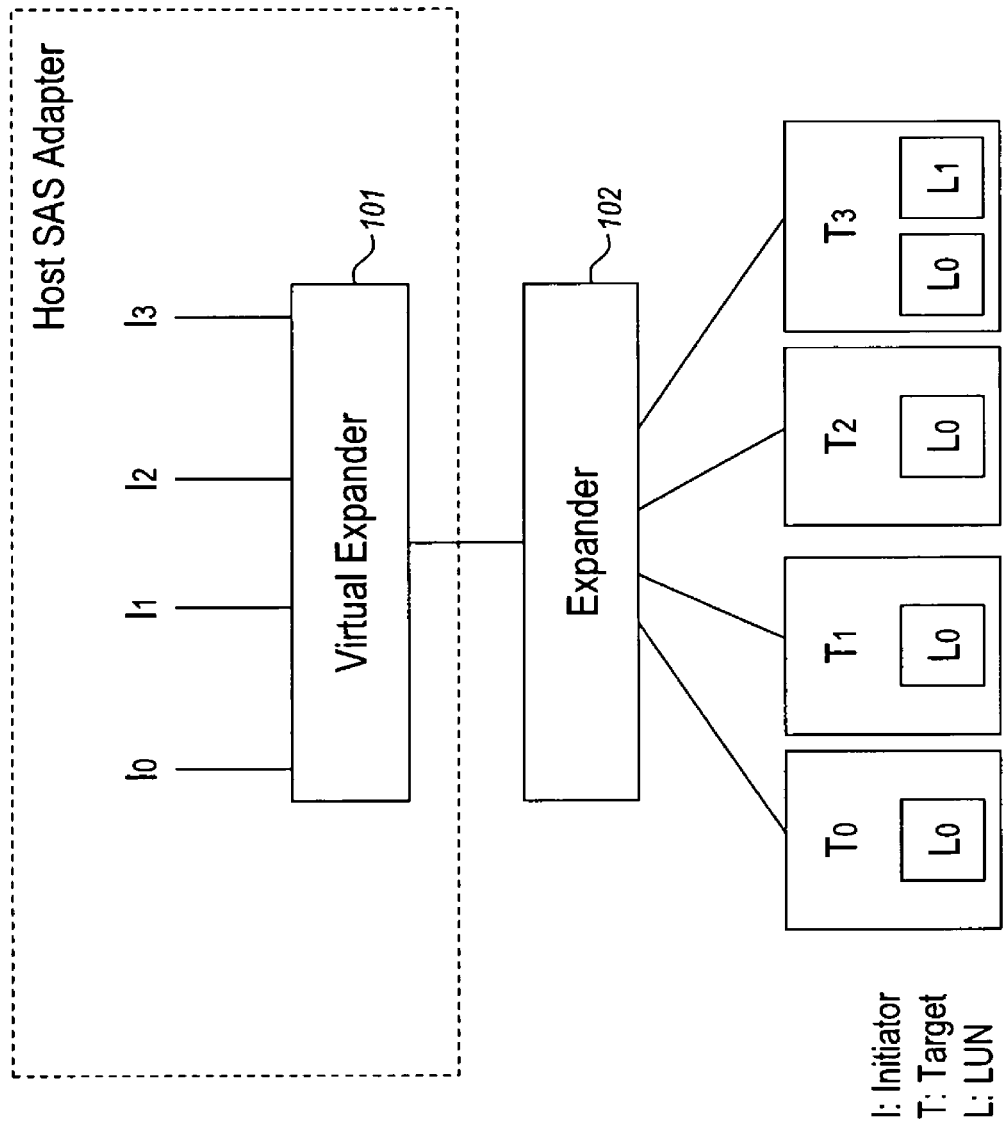
FIG. 1 is a block diagram illustrating a Host SAS Adapter configuration.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention provides a method to virtualize the SAS storage adapters and enclosures. This method can be implemented in hardware so that no additional latency is incurred. In a large computer system, a virtualization platform, also known as the hypervisor, usually sits on top of the physical hardware resources, and provides the function of administering resource management through the Hardware Management Console (HMC). The hypervisor provides a level of abstraction to the operating system. For example, from the perspective of the partition's operating system, virtual hardware resources appear as if they belong to that partition. The hypervisor controls partition access to the hardware resources. Each operating system receives a logical storage adapter that is a portion of the physical storage adapter. The hypervisor supports the configuration of a logical adapter, and exposes only those devices to which this adapter is allowed access. The logical storage adapter is treated by the partition just like a dedicated physical storage adapter.

Therefore, in the present invention, only a single storage adapter is required to support multiple partitions. There is no need to purchase a separate adapter for each logical partition of the system. Each logical adapter works like a separate physical adapter, and no coordination or communication is required between the various device drivers or operating system partitions. The partitions are also isolated from each other. Thus, one partition will not corrupt or cause damage to another partition, even if the device driver behaves improperly. The present invention enables zero-copy transfers of data with no intervening copying of the data, just like well-implemented physical SAS adapters do. Moreover, the storage device enclosure is shared among separate operating system partitions. Each device is seen by only a single partition and no partition communication is required to coordinate access. Furthermore, the present invention is fully interoperable with the existing SAS products. A SAS expander is the item that provides connectivity in the SAS fabric. It provides similar function as a switch in a network environment, and allows for one entity on the fabric to talk to many other entities. The present invention enables the physical storage adapter to appear as a logical SAS expander and a set of storage adapters. This greatly reduces the cost of the system.

In one embodiment of the present invention, a virtualized InfiniBand interface is implemented as a software interface to the Host SAS adapter that is presented to the partition. The Host SAS Adapter then maps the virtual interface into physical SAS.

In order for a partition to communicate with a storage device through the InfiniBand interface, it must first create a work queue (WQ) that consists of a queue pair (QP). To execute an operation, it must place a work queue element (WQE) in the WQ. From there the operation is picked-up for execution by the SAS adapter. Therefore, the WQ forms the communications medium between the partition and the SAS adapter, relieving the operating system from being involved. Each process may create one or more QPs for communications, where each QP has an associated context. QPs can be implemented in hardware to off-load most of the work from the CPU. Once a WQE has been processed properly, a completion queue element (CQE) is created and placed in the completion queue (CQ). Using the CQ for notifying the caller of completed WQEs reduces the interrupts that would be otherwise generated.

The implementation of one embodiment of the present invention is described as follows.

Host SAS Adapter Configuration

Host SAS Adapter configuration is initiated from the HMC. This configuration is performed by the hypervisor so that the partitions do not need to be involved. During the configuration, the logical adapters are created and assigned to partitions, and the devices are assigned to the partitions that have access to them.

In SCSI, an initiator refers to an entity sending a command, and a target is an entity (e.g. a disk driver) receiving the command. In one embodiment of the present invention, each logical storage adapter acts as an initiator. Each logical storage adapter has its own initiator ID so that transactions on the SAS fabric can be executed properly. The Host SAS Adapter configuration set up the fabrics-related parameter of Initiator SAS address (I). The initiator address is a component of the Initiator/Target/Logic Unit Number Nexus (I_T_L Nexus, in which T is the Target SAS Address and L is the Logic Unit Number (LUN), where a LUN is the address assigned to a logical unit). A logical unit here is a storage entity that can include part of the storage on a disk drive, the entire storage on a disk drive, the total storage on multiple drives in a disk array, or any combination thereof.

FIG. 1 illustrates the Host SAS Adapter configuration. An I_T_L Nexus is automatically generated and used during the execution of each command. For example, the $I_0\_T_0\_L_0$ Nexus refers to a mapping from the initial SAS address $I_0$ to the target SAS address $T_0$, where the logic unit is $L_0$. After the Host SAS Adapter configuration, the I_T_L Nexus configurations appear like a physical SAS expander 102 and a set of Initiators 101. Each virtual SAS initiator ($I_0$-$I_3$) has its own SAS address and is logically independent on the bus.

Existing technology/protocols can be used to utilize the present invention with no further change required. The hypervisor can perform fabric discovery and initialization using the standard SAS/SMP (SAS Management Protocol) protocols. These protocols are driven by the hypervisor, and they are not exposed to the partitions.

Logical SAS Adapter

Each logical operating system partition has its own Logical SAS Adapter. $I_0$, $I_1$, $I_2$ and $I_3$ in FIG. 1 are associated to four different logical adapters. The system treats this logical adapter just like it would treat a dedicated physical adapter.

In one embodiment of the present invention, a set of hypervisor calls can be defined to configure and program a logical adapter, through which the partition obtains Vital Product Data (VPD) information, which is a collection of configuration and informational data associated with the adapter and devices, as well as capabilities of the adapter. The virtual InfiniBand interface is employed to register memory, and to configure and use the QPs and other InfiniBand resources. For example, a QP can be used for normal command execution, while another QP is used for asynchronous events.

Memory Registration

When data storage is accessed, data is transferred directly to/from partition memory to the storage device. The use of InfiniBand memory regions enables direct data access. A partition first registers memory regions reserved for the direct data transfer, e.g. using a hypervisor call. The hypervisor then constructs all required structures so that the hardware can translate the address of a memory region into physical addresses and generate the correct transactions to the memory subsystem.

Memory regions are not explicitly used at the SAS interface level. Instead, an I_T_L_Q Nexus is used, where I=Initiator SAS Address, T=Target SAS Address, L=LUN and Q=Task Identifier. When an operation is started, the hardware generates an I_T_L_Q Nexus, and correlates it to the correct offsets in the associated memory region(s). Then, if the operation requests a data transfer, the hardware can correlate from I_T_L_Q Nexus back to the correct memory region and to the correct physical address, and perform the data transfer. The creation and management of an I_T_L_Q Nexus can be handled completely by the hardware, and no software is involved.

The exact implementation of QP allocations in the partition is determined by the application. For example, for one application, one QP is allowed for each physical device. But in a different application, one QP is allowed for a logical adapter. For illustration purpose, one embodiment of the present invention allows one QP for each physical device.

Figure 2:
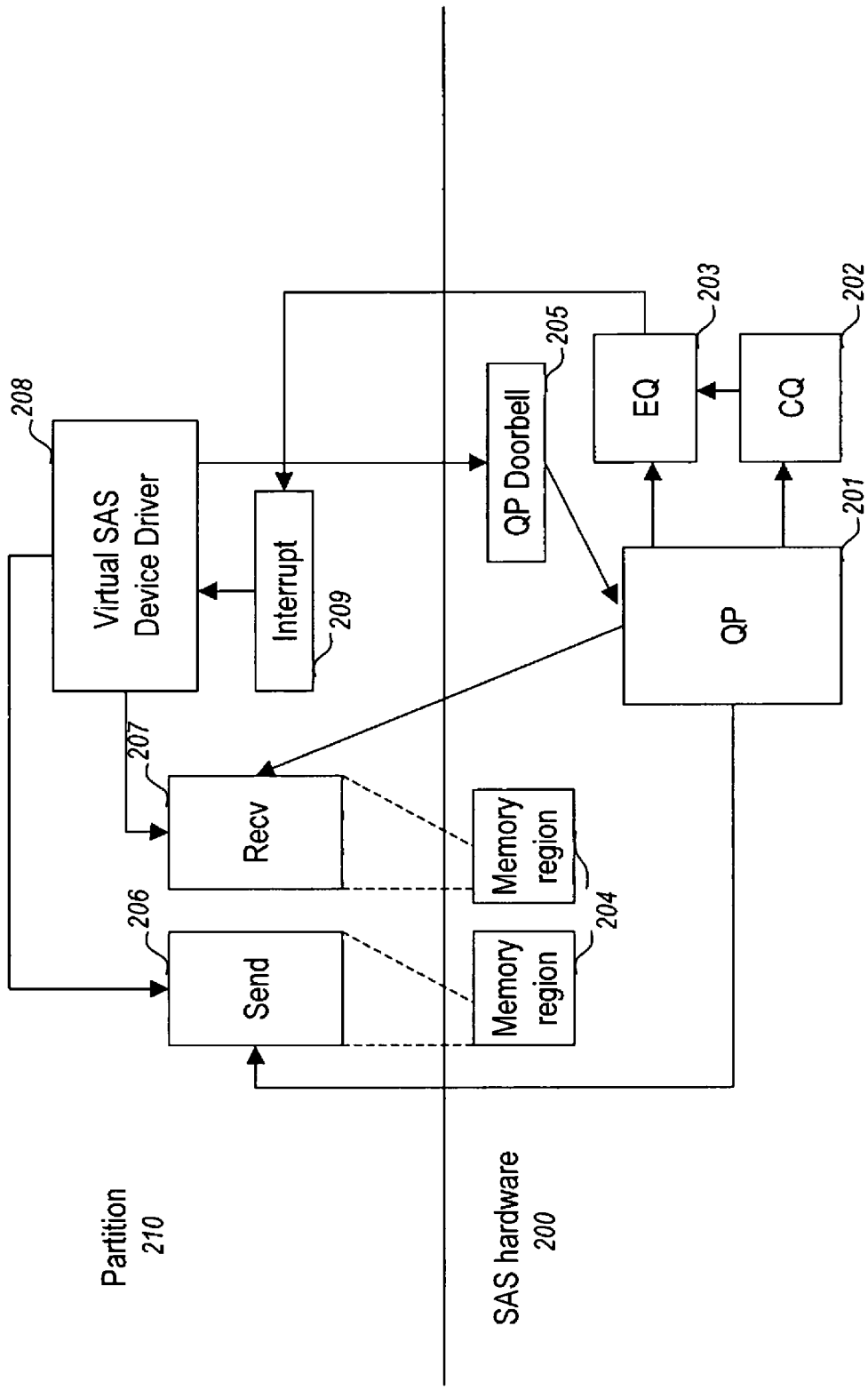
FIG. 2 is a block diagram showing components of one embodiment of the present invention.

Therefore, each device allocates at least one QP 201, one CQ 202, one Event Queue (EQ) 203, and a number of memory regions 204, as illustrated in FIG. 2. Each QP 201 owns a send queue 206 and a receive queue 207. The partition 210 has access to the QP doorbell 205 for placing the send and receive units of work on the QP 201. In the InfiniBand interface, these units of work are WQE's. The WQE's on the send and receive queues contain scatter/gather type descriptors, each of which has a Key and a Token that are used to address a piece of partition storage where the unit of work to be sent or the storage to use for received data. The QP's 201 also reference CQ's 202, which can be a single CQ, or a pair of CQ's, one for the send queue and one for the receive queue. The CQ's 202 reference the EQ 203 that is used to interrupt the partition (in 209) on the completion of a work or in the event of an error. EQ 203 is the most limited resource of an adapter, so typically there is one EQ 203 per QP 201.

Data storage access operations for one embodiment of the present invention are described with reference to FIG. 3-FIG. 4 in the following paragraphs.

Figure 3:
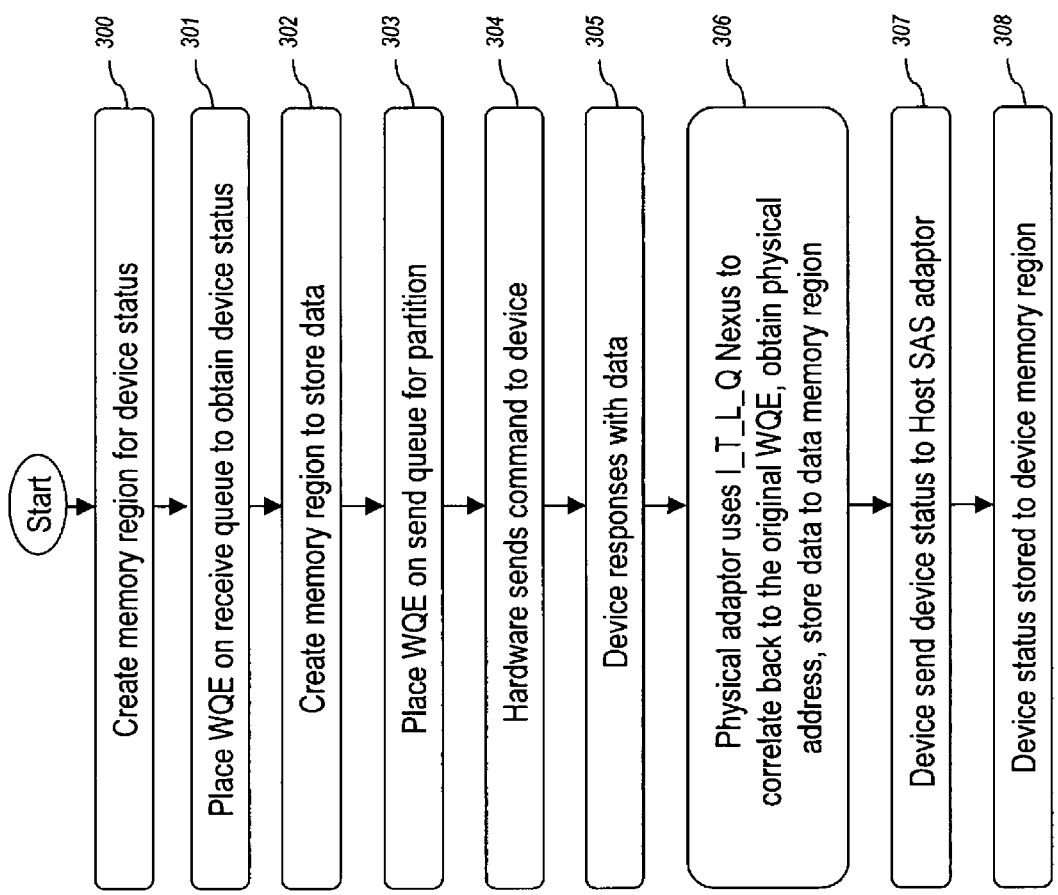
FIG. 3 is a flowchart illustrating a read flow in one embodiment of the present invention.

FIG. 3 is a flowchart illustrating a read flow in one embodiment of the present invention, which includes but is not limited to logical read and inquiry commands. The read flow starts and create memory regions for device status in state 300, then a WQE is placed on the receive queue to receive the device status (state 301). In state 302, a memory region will be created via an Hcall as used for the Host Channel Adapter in InfiniBand. This memory region Hcall maps a virtual area in memory to a physical address range so that the hardware can access data directly to/from this memory region, and this memory region is reserved to contain the read data received from the storage device. In state 303, a WQE is formed and placed on the send queue for the partition. The WQE contains a request ID and a memory region descriptor for read data. More specifically, the WQE has a SCSI Command Descriptor Block (CDB) as well as descriptor(s) (including address/length/key) for the memory region which will contain the read data. The hardware sends the read command to the device in state 304, and the storage device responds with data in state 305. Next in state 306, the physical adapter uses the I_T_L_Q Nexus to correlate this request back to the original WQE, and generates the actual physical address. Data is then stored into the data memory region. In state 307, the storage device sends device status (e.g. SCSI status and auto sense) to the host SAS adapter. And then in state 308, device status data is sent to memory region created for device status. The device status indicates the success or failure of the read, and, if the read fails, details of the failure. The request ID will be attached to the original send WQE, so that the firmware can detect which request this device status is associated with. If the data is small, it can be received as "immediate" data, which means the data is actually placed in the Receive WQE, rather than in the location as indicated by memory region descriptor. If the data is large (e.g. larger than 128 bytes), the data will be placed in the normal memory region that the memory region descriptor indicates. Note that data is not placed into the CQE because WQEs must complete in order, and this would preclude unordered tagged command queueing and have a deleterious performance impact. The device driver can then interpret the device status data.

Figure 4:
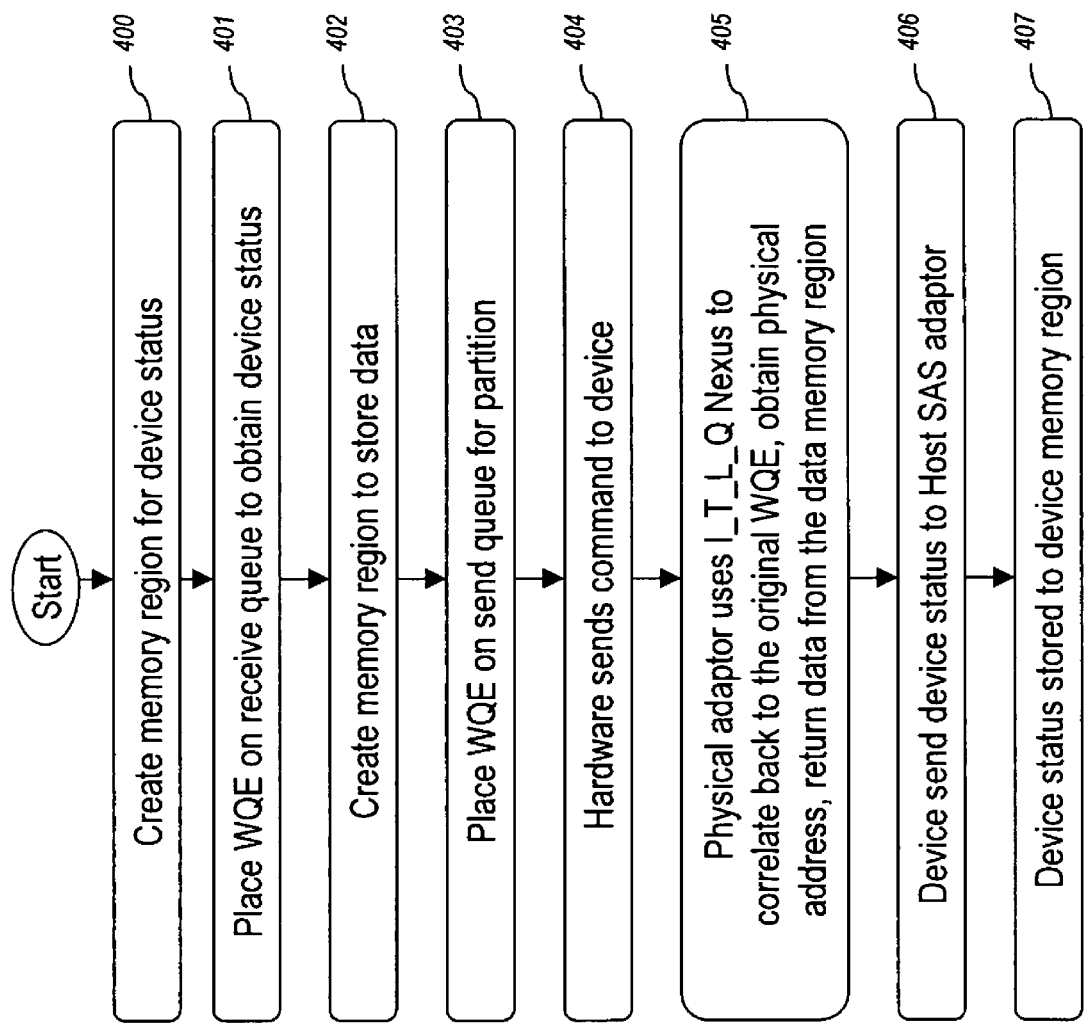
FIG. 4 is a flowchart illustrating a write flow in one embodiment of the present invention.

FIG. 4 is a flowchart illustrating a write flow (i.e. a logical write) of one embodiment of the present invention. The logical write starts and create memory regions for device status in state 400. In state 401, a WQE element is placed on the receive queue to receive the device status. The application desired to write data to a storage device has stored the data in the main system memory. In state 402, the memory region containing the data is identified via an Hcall as for the Host Channel Adapter in InfiniBand. This memory region Hcall maps a virtual area in memory to a physical address range so the hardware can access data directly to/from the memory region. During the write flow, the SAS hardware will read the data from this memory region and send it to the device. In state 403, a WQE is formed and placed on the send queue for the partition. WQE contains a request ID and a memory region descriptor for read data. This WQE will contain SCSI CDB as well as a descriptor for the memory region which contains the data to be written. In state 404, the hardware sends command to the device, and then in state 405, the physical adapter uses the I_T_L_Q Nexus to get memory region ID from original send WQE, which is then used to get physical address and returns data from that address. During the write flow, the data in system memory is unchanged. The I_T_L_Q Nexus is used to identify which memory locations are to serve as the source data for the write flow. This memory region is then read and sent to the device. The device then stores the data. In state 406, the storage device sends device status (e.g. SCSI status and auto sense) to the Host SAS adapter. Next in state 407, the device status is stored in the device status memory region described to receive queue WQE. The device status indicates the success or failure of the write, and, if the write fails, details of the failure. The request ID will similarly be attached to the original send WQE so that the firmware can detect which request this device status is associated with. If the data is small, the data could be received as "immediate" data that is actually placed in the Receive WQE, rather than in the location indicated by the memory region descriptor. However, if the data is large (e.g. larger than 128 bytes), this data can be placed in a normal memory region as indicated by the memory region descriptor. The device driver can then interpret the device status data.

Figure 5:
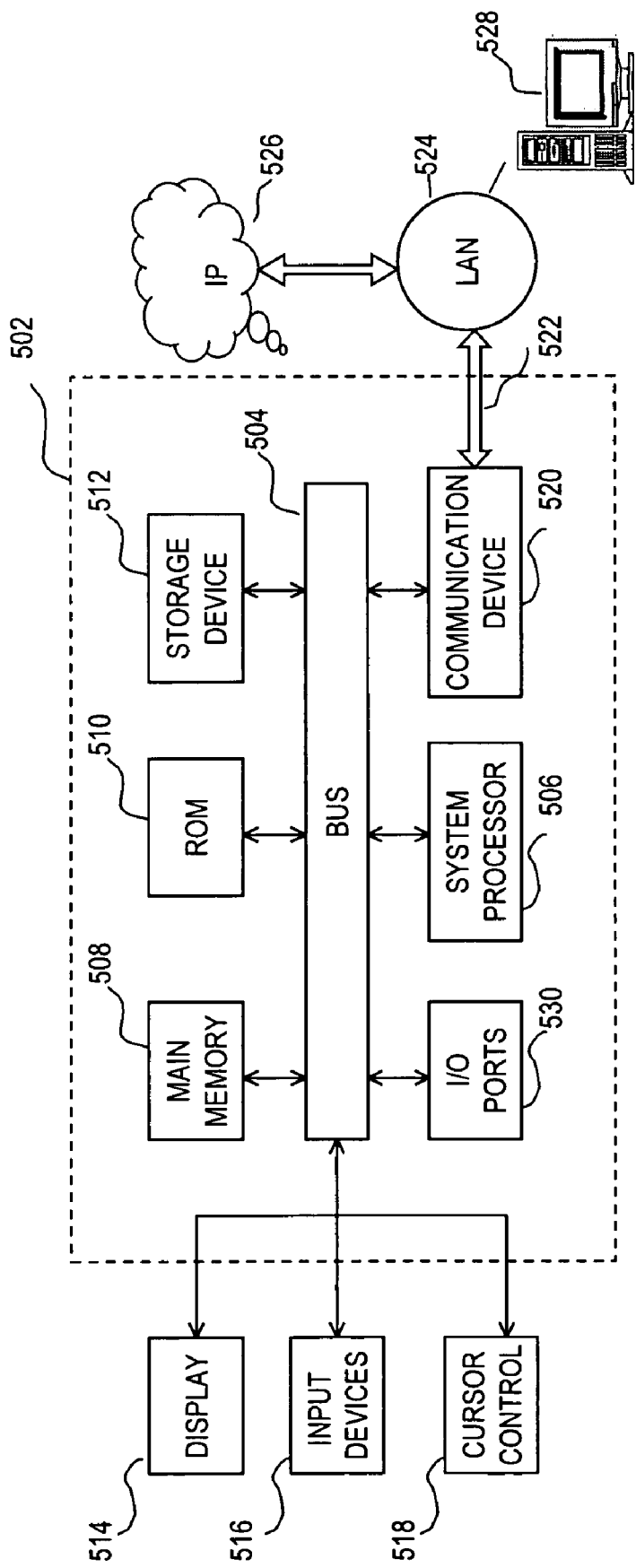
FIG. 5 is a conceptual diagram of a computer system in which the present invention can be utilized.

FIG. 5 illustrates a computer system (502) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (504) or other communication mechanism for communicating information and a processor (506) coupled with bus (504) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (506). In addition, main memory (508) may be used for storing temporary variables or other intermediate information during execution of instructions to be executed by processor. The computer system further includes a read only memory (ROM) 510 or other static storage device (e.g., programmable ROM (PROM), erasable PROM (EPROM), and electrically erasable PROM (EEPROM)) coupled to bus 504 for storing static information and instructions for processor. A storage device (512), such as a magnetic disk or optical disk, is provided and coupled to bus for storing information and instructions. This storage device is an example of a computer readable medium.

The computer system also includes input/output ports (530) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1-FIG. 4. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (514), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (516) and a cursor control (518), for communicating information and command selections to processor (506). Such command selections can be implemented via voice recognition hardware and/or software functioning as the input devices (516). The cursor control (518), for example, is a mouse, a trackball, cursor direction keys, touch screen display, optical character recognition hardware and/or software, etc., for communicating direction information and command selections to processor (506) and for controlling cursor movement on the display (514). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (520) provides a two-way data communication coupling to a network link (522) that may be connected to, for example, a local network (524). For example, the communication interface (520) may be a network interface card to attach to any packet switched local area network (LAN). As another example, the communication interface (520) may be an asymmetrical digital subscriber line (ADSL) card, an integrated services digital network (ISDN) card or a modem to provide a data communication connection to a corresponding type of telephone line. Wireless links may also be implemented via the communication interface (520). In any such implementation, the communication interface (520) sends and receives electrical, electromagnetic or optical signals that carry digital data streams representing various types of information.

Network link (522) typically provides data communication through one or more networks to other data devices. For example, the network link may provide a connection to a computer (526) through local network (524) (e.g., a LAN) or through equipment operated by a service provider, which provides communication services through a communications network (528). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for virtualizing an SAS (Serial Attached Small-Computer-System-Interface) storage adapter, connected to a storage device, for logical partitions of a computer system, comprising:
    assigning, using a hypervisor, a logical storage adapter to a selected one of the logical partitions;
    configuring the logical storage adapter, using the hypervisor, and assigning an initiator SAS address to the logical storage adapter;
    generating an Initiator/Target/Logic unit number nexus (I_T_L nexus) that correlates the initiator SAS address, a target SAS address of the storage device, and a logic unit number that is an address of a storage entity of the storage device; and
    enabling data storage operations to access the storage entity through the logical storage adapter using the generated nexus.

2. The method of claim 1, wherein
    the assigning a logical storage adapter includes assigning a plurality of logical storage adapters each for one of the logical partitions; and
    the configuring the logical storage adapter includes implementing a logical SAS expander and assigning a plurality of initiators each for one of the logical storage adapters.

3. The method of claim 1, wherein the logical storage adapter provides an InfiniBand programming interface to the selected logical partition.

4. The method of claim 1, wherein the configuring comprises memory registration that creates and manages a memory region used for data access.

5. The method of claim 1, wherein the data storage operations comprise a read operation that places data directly into a memory of the selected logical partition.

6. The method of claim 1, wherein the data storage operations comprise a write operation that retrieves data directly from a memory of the selected logical partition.

7. The method of claim 1, wherein the hypervisor receives device command completion status information and places the information directly into a memory region identified through one of the data storage operations.

8. A computer program product for virtualizing a SAS (Serial Attached Small-Computer-System-Interface) storage adapter, connected to a storage device, for logical partitions of a computer system, the computer program product comprising:
    a computer usable medium having computer usable program code embodied therewith, the computer usable program code comprising:
        instructions to assign, using a hypervisor, a logical storage adapter to a selected one of the logical partitions;
        instructions to configure the logical storage adapter, using the hypervisor, and to assign an initiator SAS address to the logical storage adapter;
        instructions to generate an Initiator/Target/Logic unit number nexus (I_T_L nexus) that correlates the initiator SAS address, a target SAS address of the storage device, and a logic unit number that is an address of a storage entity of the storage device; and
        instructions to enable data storage operations to access the storage entity through the logical storage adapter using the generated nexus.

9. The computer program product of claim 8, wherein
    the instructions to assign a logical storage adapter includes instructions to assign a plurality of logical storage adapters each for one of the logical partitions; and
    the instructions to configure the logical storage adapter includes instructions to implement a logical SAS expander and to assign a plurality of initiators each for one of the logical storage adapters.

10. The computer program product of claim 8, wherein the logical storage adapter provides an InfiniBand programming interface to the selected logical partition.

11. The computer program product of claim 8, wherein the instructions to configure comprise instructions for memory registration that creates and manages a memory region used for data access.

12. The computer program product of claim 8, wherein the data storage operations comprise a read operation that places data directly into a memory of the selected logical partition.

13. The computer program product of claim 8, wherein the data storage operations comprise a write operation that retrieves data directly from a memory of the selected logical partition.

14. The computer program product of claim 8, wherein the hypervisor receives device command completion status information and places the information directly into a memory region identified through one of the data storage operations.

15. A computer system comprising:
    a processor;
    a memory operatively coupled with the processor;
    a storage device operatively coupled with the processor and the memory; and
    a computer program product for virtualizing a SAS (Serial Attached Small-Computer-System-Interface) storage adapter, connected to a storage device, for logical partitions of a computer system, the computer program product comprising:
        a computer usable medium having computer usable program code embodied therewith, the computer usable program code comprising:

instructions to assign, using a hypervisor, a logical storage adapter to a selected one of the logical partitions;

instructions to configure the logical storage adapter, using the hypervisor, and to assign an initiator SAS address to the logical storage adapter;

instructions to generate an Initiator/Target/Logic unit number nexus (I_T_L nexus) that correlates the initiator SAS address, a target SAS address of the storage device, and a logic unit number that is an address of a storage entity of the storage device; and instructions to enable data storage operations to access the storage entity through the logical storage adapter using the generated nexus.

16. The computer system of claim 15, wherein the instructions to assign a logical storage adapter includes instructions to assign a plurality of logical storage adapters each for one of the logical partitions; and the instructions to configure the logical storage adapter includes instructions to implement a logical SAS expander and to assign a plurality of initiators each for one of the logical storage adapters.

17. The computer system of claim 15, wherein the logical storage adapter provides an InfiniBand programming interface to the selected logical partition.

18. The computer system of claim 15, wherein the instructions to configure comprise instructions for memory registration that creates and manages a memory region used for data access.

19. The computer system of claim 15, wherein the data storage operations comprise a read operation that places data directly into a memory of the selected logical partition.

20. The computer system of claim 15, wherein the data storage operations comprise a write operation that retrieves data directly from a memory of the selected logical partition.

21. The computer system of claim 15, wherein the hypervisor receives device command completion status information and places the information directly into a memory region identified through one of the data storage operations.

22. The method of claim 1, wherein the I_T_L nexus is generated using standard SAS/SMP (SAS Management Protocol) protocols.

23. The computer program product of claim 8, wherein the I_T_L nexus is generated using standard SAS/SMP (SAS Management Protocol) protocols.

24. The computer system of claim 15, wherein the I_T_L nexus is generated using standard SAS/SMP (SAS Management Protocol) protocols.

* * * * *